United States Patent [19]
Hisatake et al.

[11] Patent Number: 4,757,454
[45] Date of Patent: Jul. 12, 1988

[54] OPERATION DATA-RECORDING SYSTEM FOR A MACHINE

[75] Inventors: Tsuneo Hisatake; Tadashi Atono; Izuru Morita; Shoji Tozawa, all of Tokyo; Masao Fujiwara; Yoshinobu Nakamura, both of Sagamihara, all of Japan

[73] Assignees: Caterpillar Mitsubishi Limited, Tokyo; Mitsubishi Jukogyo, K.K., Kanagawa, both of Japan

[21] Appl. No.: 766,906

[22] Filed: Aug. 16, 1985

[30] Foreign Application Priority Data

Aug. 20, 1984 [JP] Japan ................. 59-173062
Oct. 3, 1984 [JP] Japan ................. 59-207767

[51] Int. Cl.$^4$ ........................................... G06F 15/20
[52] U.S. Cl. ................................. 364/424; 340/52 F; 346/33 R
[58] Field of Search ............ 364/424, 550, 551; 73/117.3; 346/33 R; 340/52 R, 52 F; 377/20

[56] References Cited

U.S. PATENT DOCUMENTS

| | | | |
|---|---|---|---|
| 4,258,421 | 3/1981 | Juhasz et al. | 340/52 F |
| 4,267,569 | 5/1981 | Baumann et al. | 364/424 |
| 4,271,402 | 6/1981 | Kastura et al. | 340/52 F |
| 4,296,409 | 10/1981 | Whitaker et al. | 364/424 |
| 4,395,624 | 7/1983 | Wartski | 364/424 |
| 4,398,258 | 8/1983 | Naitoh et al. | 364/424 |
| 4,477,874 | 10/1984 | Ikuta et al. | 364/424 |

Primary Examiner—Gary Chin
Attorney, Agent, or Firm—Robert E. Burns; Emmanuel J. Lobato

[57] ABSTRACT

This invention provides a system for recording operation data of a machine, wherein a program for converting signals stored through a sensor or measuring means into operation data in conformity with the increase or alteration of the sensor or measuring means due to the operation status of the machine or to the type of the component of the machine is preliminarily stored in one or separate card-type external memory or other transportable external memory. The terminal of the system is designed to allow an connection of various kinds of the sensor or measuring means. Accordingly, it is possible to conduct processing and recording of various kinds of operation data by exchanging the external memory stored with a prescribed operation data-processing program, or by changing the writing of the program. It is also possible to record operation data in the external memory stored with the operation data-processing program after the program is read out to simplify the operation of an operator.

6 Claims, 5 Drawing Sheets

OPERATION DATA-RECORDING SYSTEM FOR A MACHINE

BACKGROUND OF THE INVENTION (a) Field of the Invention

This invention relates to a recording system for recording in an external transportable memory device operation data of a machine, for example, an earthworking vehicle such as an off-highway truck or a loader, heavy duty vehicles, and a plant, and more particularly to a system having a general-purpose property in its operation data-recording device.

(b) Description of the Prior Art

In order to control the operation of vehicles, a tachometer has been utilized to record analogue representations of speed, traveled distance and engine speed on a uniformly rotating cylindrical recording paper with a printing needle.

Since the recording by such a tachometer is limitted to a mechanical measurement and the recording paper therefor is narrow in width, it is very difficult to accurately read the recorded data and is impossible to automatize the processing of the recorded data (such as automated calculation of an average speed or total traveled distance).

It is also known, as disclosed in Japanese Patent Laid Open (Kokai) No. Sho 58-84394, a digitalized operation control system, which comprises a recording device mounted on a vehicle such as a truck, a bus and a taxicab, and an analysis device set up on the ground, and wherein the recording device stores not only data entered by a driver for preparing a daily report, but also other data such as traveled distance and speed which can be automatically stored at predetermined time intervals. When the memory device housed within the recording device and stored with above various data is connected to the analysis device set up on the ground, an operational daily report is automatically supplied.

An employment of a recorder/analysis device comprising a microcomputer as mentioned above makes it possible to automatized the processing of operation data.

Since operation data required for a specific operation control of an earthworking vehicle, a vehicle for any work or other machine differs depending on the content of the operation, as well as on a specific operation data-detecting and measuring device to be employed in the operation, the specification of the data-recording device is also required to be separately prepared.

Under the circumstances, it is highly desired to develop an operation data recording system which is extendable and of general-purpose property, thereby to increase the capacity thereof in accordance with the operation conditions of a machine, and to permit interchanging of a processing program for conducting the conversion of measured signals stored from each different sensor or measuring means into operation data.

It would be also desirable if it is possible to store the processing program of the operation data in an IC card or other external memory, and to record operation data in the external memory after performing the reading of the program with an operation data-recording device.

SUMMARY OF THE INVENTION

An object of this invention is to provide an operation data-recording system of extendable and general-purpose property, which can be utilized in combination with an external memory.

According to this invention, there is provided an operation data-recording system for a machine, which comprises;

a sensor or measuring means for detecting or measuring an operation status of a machine;

a terminal for storing measured signals from said sensor or measuring means;

a transportable external memory written with a program for processing the measured signals from said sensor or measuring means to convert them into operation data;

a reader for reading said program, which is adapted to be detachably connected with said external memory;

an operation data-processing means for processing operation data according to signals from said sensor or measuring means, which are supplied through said terminal and following a program read by said reader; and a writing means to record the operation data thus obtained through said data-processing means in said external memory.

DESCRIPTION OF THE PREFERRED EMBODIMENT

Figure 1:
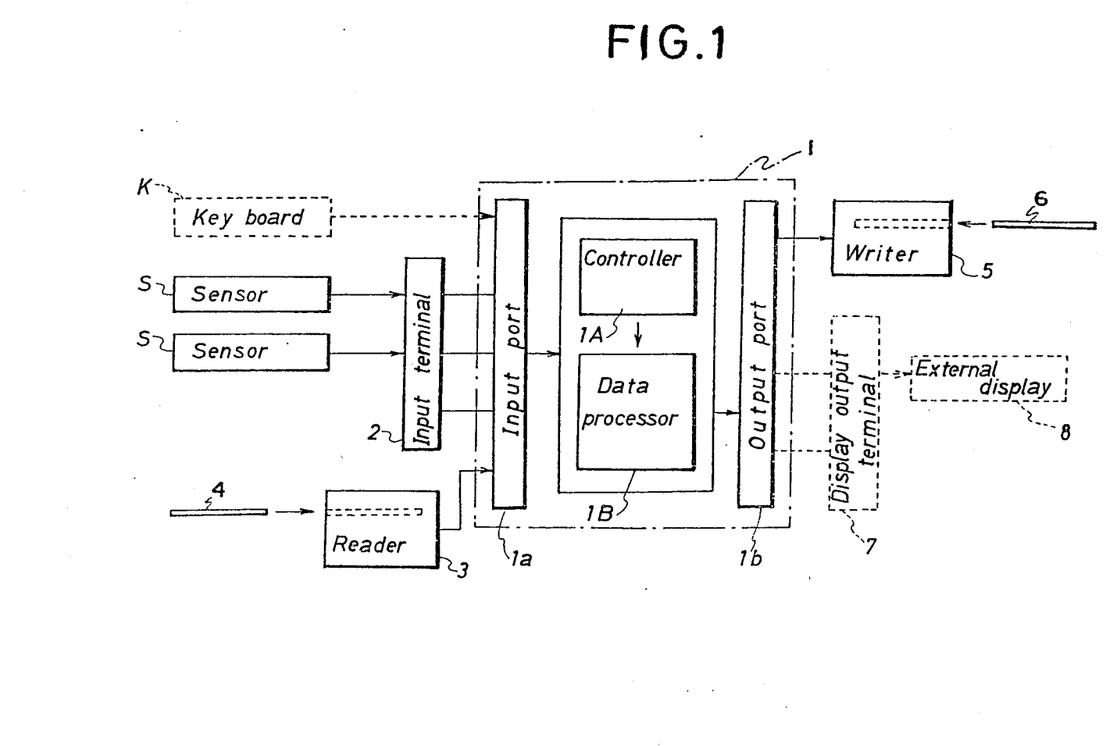
FIG. 1 is a function block diagram.

FIG. 1 shows a block diagram indicating the function of an operation data-recording system of a machine according to this invention.

This operation data-recording system comprises a transportable external memory 4 as a memory medium, a reader 3 for reading an operation data-converted program stored in the external memory 4, an operation data conversion means 1 for converting signals supplied from a sensor or measuring means S through a signal input terminal 2 on the basis of a program which is preliminarily supplied, and a writing means 5 for writing operation data obtained by the operation data conversion means 1 in the external memory 6.

The signal input terminal 2 is so designed that various kinds of sensor or measuring means S can be connected therewith through an interface, thereby allowing the connection of any desired sensor or measuring means therewith in conformity with the operation content of a machine.

Reader 3 reads an operation data conversion (processing) program stored in the transportable external memory 4 to store them in the operation data conversion means 1. The signals stored by this program are processed into operation data.

In this external memory 4 or operation data conversion means 1 is stored a control program for calculating operation data on the basis of signals supplied from the terminal 2 by the execution of an operation data-processing program, and outputting the operation data thus obtained to the writing means 5 or an external display means 8.

Accordingly, detected or measured signals stored through the terminal 2 are converted into operation data by an operation data-processor 1B which is controlled by a controller 1A of the operation data conversion means 1, and are then supplied as an output.

In the writing means 5, the operation data thus supplied are recorded in the external memory 6 which is detachably fitted to the writing means 5.

If desired, the external display means 8 may be provided for displaying the operation data. In this case, an external display output terminal 7 may be disposed as indicated in a dotted line.

This output terminal 7 is so designed that one or more external display means 8 such as CRT, LED or printer may be connected therewith.

"K" shown in FIG. 1 indicates an external input means for allowing an operator to store predetermined data therein.

Figure 2:
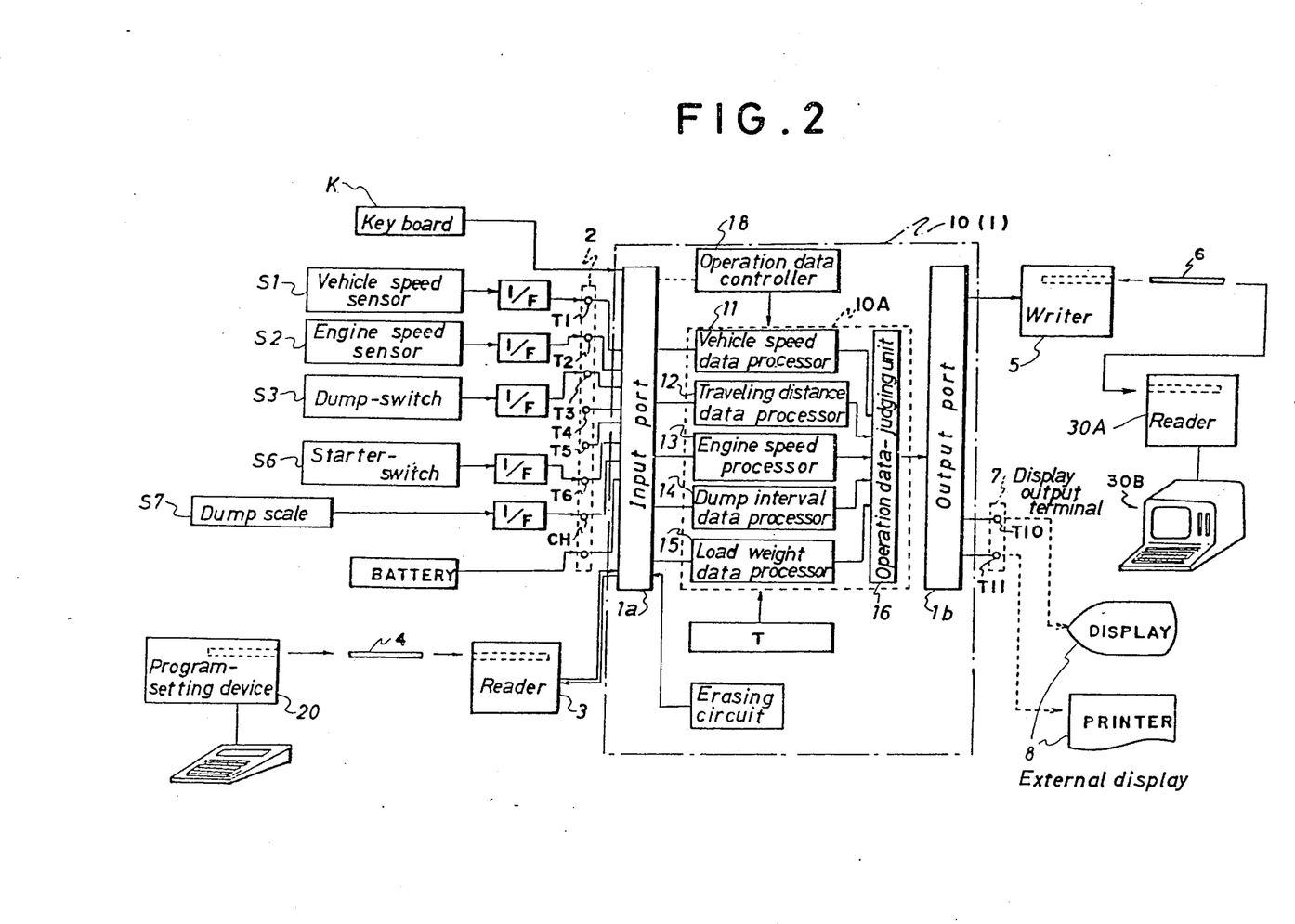
FIG. 2 is a function block diagram showing one embodiment of this invention as applied to an off-highway truck.

Next, the operation data-recording system for a machine will be explained with reference to FIGS. 2 to 4, which show one embodiment as applied to an off-highway truck.

This operation data-recording system comprises a plurality of sensors Sn, an external memory comprising an IC card, and a microcomputer 10 comprising a measurement signal input terminal 2, an IC card reader 3 and an IC card writer 5.

The measurement signal input terminal 2 in this embodiment has six terminals T1-T6. The terminal T1 is a terminal for a speed sensor S1, which detects the speed of a vehicle from the rotation speed of wheels or a speed meter. The terminal T2 is a terminal for an engine speed sensor S2, which detects the engine speed. The terminal T3 is a terminal for a dump-switch S3 connector, which detects the number of up and down movements of a vessel. The terminals T4 and T5 are terminals for extension. The terminal T6 is a terminal for connecting with a starter switch (a disconnector switch) S6 of a vehicle.

These sensors S1-S6 supply measurement signals (or detection signals) to the microcomputer 10 through an interface I/F. This microcomputer 10 is connected to the battery V of a vehicle through a connector cable to receive electricity.

In this embodiment, these sensors S1-S6 are all mounted on a vehicle. However, these measured signals may be supplied through a measurement device set up out of the vehicle to the microcomputer 10.

Reference mark CH indicates a transmitting terminal for RS232C, which is utilized for storing data on the loaded weight which are measured with a load weight-measuring device (or dumpscale) S7 set up on the operation site in the microcomputer 10 via a serial transmission.

The input terminal 2 communicated with an input port 1a of the microcomputer 10 is so designed as to allow connections through the interface I/F with various kinds of sensors or measuring devices for detecting operation control data in addition to the sensor mentioned above, and therefore has extendable and general-purpose properties.

The IC card reader 3 performs readings of the operation data-processing program and the operation data-control program stored in the IC card 4, and supply the information thus obtained to the microcomputer 10.

The operation data control program is preliminarily stored in the memory of the microcomputer 10.

A list of programs each corresponding to the object of control of operation data as well as to the type of the sensor or measuring means mounted on a vehicle is written into this IC card 4 by a controlling operator using a program-setting device 20 comprising a microcomputer.

The operation data-processing program stored in this IC card 4 is transmitted to the microcomputer 10 through the IC card reader 3 and the input port 1a, and then processed by this microcomputer 10.

Accordingly, depending on the data-processing program desired to be applied to the system, the measurement signals can be processed in various ways, for example in a time-sequential way or as a historgram.

When a different measurement signal is supplied the data can be correspondingly processed.

Accordingly, the microcomputer 10 is in a cleared condition with respect to the operation data processing.

The microcomputer 10 stored with a program of the IC card 4 comprises according to this invention a vehicle speed data processing means 11 to obtain vehicle speed data at a unit time interval on the basis of signals supplied from the vehicle speed sensor S1; a traveling distance data-processing means 12 which makes use of the vehicle speed data and traveling time data obtained from a timepiece T of the microcomputer 10; an engine speed-processing means 13 to determine the engine speed at a unit time interval on the basis of signals supplied from the engine speed sensor S2; a dump interval data-processing means 14 for obtaining dump interval data from the timepiece T on the basis of signals from the dump-switch S3, and for calculating a traveled distance corresponding to the dump interval data; and a load weight data-processing means 15 which determines load weight data supplied from the load weight-measuring device as a load weight value at the time of the dumping operation.

If desired, an operation data-judgement means 16 may be further provided in the microcomputer 10 so as to make a comparison between the operation data obtained by the operation data-processing means and predetermined standard values, and to indicate the result in an external display device and the like.

The IC card 4 or the memory of the microcomputer 10 also stores therein an operation data-control program with which the operation data-processing program mentioned above is executed, and various kinds of operation data supplied from the sensors are stored in the operation data-processing program for supplying these data afterward to the IC card writing device 5 or to the external display device 8, thereby forming an operation data-control means 18.

Figure 3:
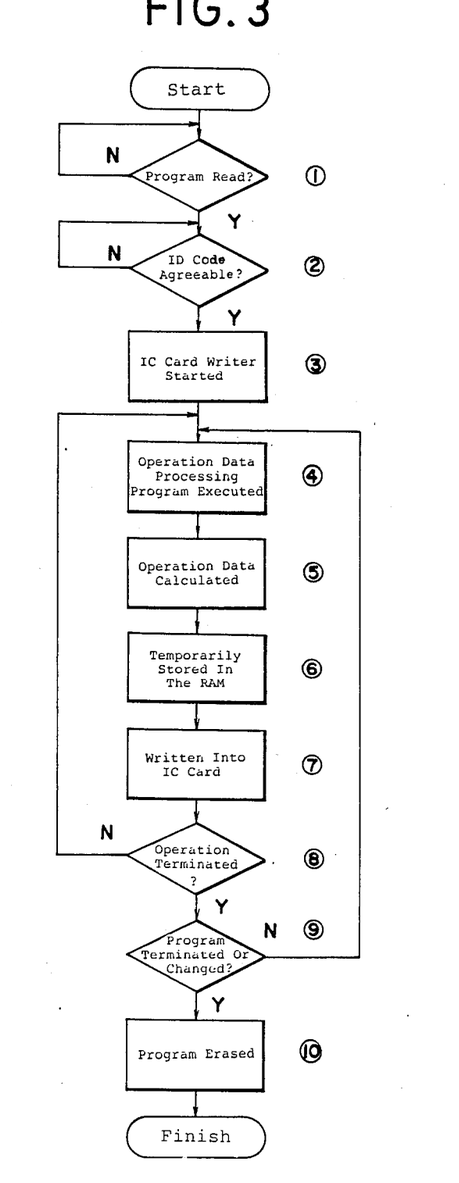
FIG. 3 is a flow chart showing a control procedure of an operation control means contained in the system of the embodiment shown in FIG. 2.

With this operation data-control means 18, a list of programs is read out of the IC card 4 by means of the IC card-reading device 3 in the first step (1) as shown in the flow-chart of FIG. 3. In the second step (2), judgement on the ID code is conducted to see if the operation data-recording IC card 6, which is introduced in the IC card-writing device 5 is in agreement with the ID code.

When the ID code is judged to be suitable, the IC card-writing device 5 is driven in the third step (3) and the IC card 6 is made ready to accept writing therein.

In the fourth step (4), each of the operation data-processing programs is executed and measured values from the sensor or measurement device are stored to obtain each operation data (the fifth step (5)).

The operation data thus obtained are temporarily stored in the RAM of the microcomputer in the sixth step (6), and then supplied to the IC card-writing device 5 in the seventh step (7) to conduct the writing into the IC card 6. The operation data may be directly transmitted from the fifth step (5) to the seventh step (7) to perform the writing. When the operation of the off-highway truck is completed in the eighth step (8) or when the operation data-processing program is terminated or required to be changed in the ninth step (9), the power supply to the microcomputer 10 is stopped and the IC card 6 is withdrawn from the IC card reader 3 in the tenth step (10), thereby finishing the operation of the operation data-processing program.

Figure 4:
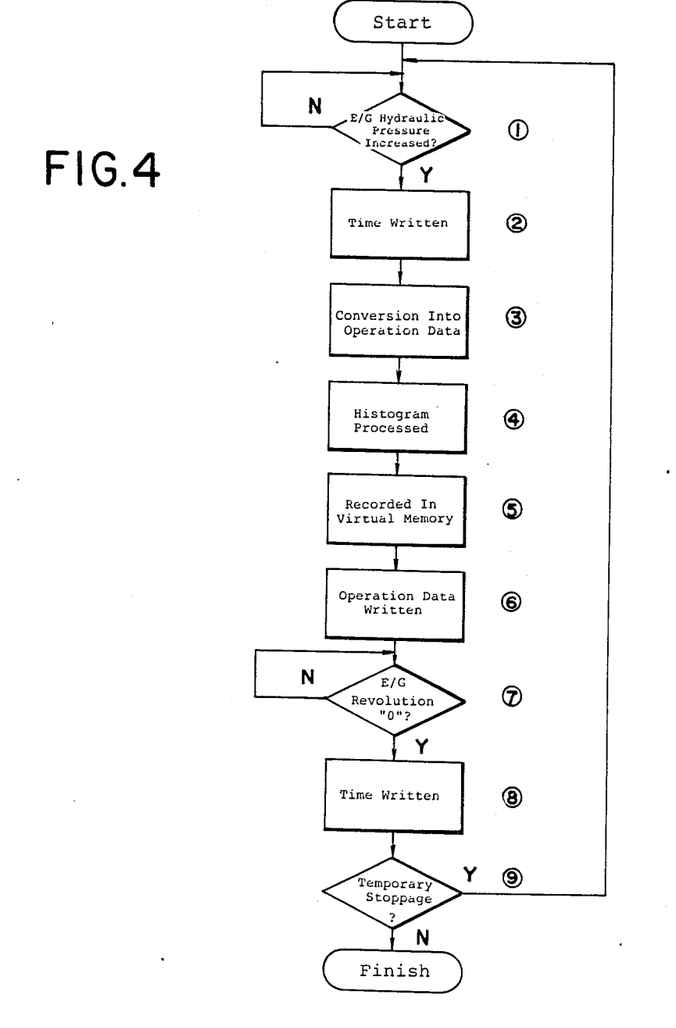
FIG. 4 is a flow chart showing a processing procedure of the operation processing means of the embodiment shown in FIG. 2.

Each of the operation data-processings 11 to 15 is carried out in the basis of a program stored in the IC card 4 being carried out in the procedure shown in the flow-chart of FIG. 4.

First, it is determined if the IC card inserted into the IC card-writing device 5 is in agreement with a predetermined ID code. When it is determined to agree with the ID code, the IC card writing device 5 is set to ready to start the writing and the subsequent steps to follow.

In the first step (1), the increase of the engine oil pressure is detected by a sensor, indicating the start of the engine. At this moment, if desired the time of start of rotation of the engine is recorded in the second step (2).

Then, measurement signals stored from each of the sensors or measuring means as explained thereafter are converted into operation data. When the signals are of analogue values, they are required to undergo A/D conversion.

The operation data thus obtained are treated either as time sequence data, or as a statistical data such as histogram data in the fourth step (4), or treated to be condensed.

These data are written through the IC card writing device 5 in the IC card 6 after or without being stored in the RAM of the microcomputer 10 as a virtual memory (the sixth step (5).

When the revolution of the engine is determined as "0" in the seventh step (7), the time of that moment is stored in the eight step (8) with the timer, and then, in the ninth step (9), a judgement is conducted whether the engine stop is temporary or not. When it is determined that the operation should keep going, the operator switches on to continue the operation, thereby returning the operation to the step (1). When it is judged that the operation should be terminated, the operator switches on a termination button thereby terminating the procedure.

The operation data-processing procedure to be conducted in the step (3) on each of the measurement signals will be explained as follows.

(1) Revolution Number of the Engine

In this embodiment, the data of the revolution number of the engine per predetermined time period is stored as pulse number and therefore is converted into the revolution number (When one revolution number is equal to four pulses, the revolution number can be calculated as: Pulse Number/4), and stored in the data memory 6 in the form of time-sequence data in every unit time, or in the form of histogram as equally divided revolution number zones.

(2) Traveling Speed and Distance

The speed data are calculated on the basis of measurement signals from a speed meter, or by multiplying the revolution number per predetermined time period by the length of the circumference of the wheel.

In this case also, these data can be stored in the form of time-sequence data or histogram in the IC card 6.

The traveling distance is calculated by integrating a traveled distance with respect to time.

(3) Weight of Load and Number of Dumping

When the switch-on of the dumping is recognized, the time of the switch-on, the traveled distance from the moment of increased engine revolution up to present time, the weight of load immediately before the dumping operation, which is transmitted through RS232C interface from a load weight-measuring device such as a bucket scale are recorded and stored in the IC card 6.

In this case, it is preferred that the writing of the load weight is conducted upon the input of a command to write.

If the load weight-measuring device is so designed that the data of the load weight are extracted from the change in hydraulic pressure or strain of a supporting mechanism, in other words, if a sensor therefor is mounted on a vehicle, the sensor may be connected to an extended terminal T5 or T6 to store the measured signals, which will then be converted into the load weight by the microcomputer 10.

Any data which are free from variable factor, such as data, a predetermined operation course, an operation site or identification number of a vehicle, are stored through an external input device "K" such for example as a keyboard in the microcomputer 10 in addition to the operation data.

The operation data processed in this way are stored in the IC card 6 through the IC card-writing device 5, which is then withdrawn by an operator after the termination of the operation.

This IC card 6 is subsequentially inserted into an IC card-reproducing device (reader) 30A which is supervised by controlling personal, and the operation data are read out. The operation data thus read out are then transmitted to a data analizer (such as a hostcomputer) 30B comprising a microcomputer which is integral with or separate from the reader 30A, and subjected to data analysis in accordance with an operation control program and the like to prepare an operation daily report, an administration source material or an analysis source material.

If the external display output terminals 7 (T10, T11) are optionally provided to the output port 1b of the microcomputer 10, data stored in the IC card 6 can also be supplied to a printer or plotter for preparing administration source material together with a display device such as CRT, LED or LCD. Accordingly, the operation data can be taken out as a hard copy before they are displayed in the external display device (not shown) of the data analysis device 30B.

When common operation data are required as in the case of an earthworking vehicle, a fundamental operation data-processing means (such as operation data-processing means for traveling speed or revolution number of engine corresponding to a tachometer in this embodiment) as well as an optional operation data-processing means (such as dumping interval data-processing means) should preferably be provided to the system body 10, so as to allow the selection of a desired optional operation data-processing means in conformity with the content of the operation.

A single IC card may be commonly employed for storing the operation data-processing program as well as the operation data.

In this case, if the IC card reader 3 and the IC card writing device 5 are integrally combined (IC card reader/writer), the operation of insertion and withdrawal of the IC cards 4 and 6 can be conveniently omitted.

When this IC card comprises CPU and EPROM (or EEPROM), and has a relatively small capacity, all of the data (the above program) may be erased, after the data are read out with the IC card reader 3, by an erasing means (such as ultraviolet ray or electricity) so as to be utilized as a blank IC card for storing other operation data.

If the IC card has a large memory capacity and is capable of storing the above program together with the operation data, it is not required to erase these program or data, and new operation data can be stored in a blank portion of its memory.

In this invention, the external memory 4 for storing the operation data-processing program, as well as the external memory 6 for storing the operation data as processed are not limitted to being an IC card as explained in the above embodiment, but the may be any form of a transportable memory medium such as a card-type memory e.g. laser card, a magnetic tape, a memorypac, floppy-disk and photo-disk.

The external memory may be invested with an intelligent function which performs a processing on the basis of stored data.

Further, the operation data-processing means (the operation data-determining means) may also be invested with a malfunction-determining means which makes a judgement of whether predetermined standard values are exceeded or not by the detected data from sensors for detecting the operation conditions of each of comoponents of a machine, such as a lubricating oil temperature sensor, a lubricating oil pressure sensor, an exhausting gas temperature sensor, an inhalated air temperature sensor, an inhalated air pressure sensor, a cooling water temperature sensor, a working member ejection pressure sensor or working oil temperature oil sensor.

In this case, it may be preferable to provide to the operation data-processing means either a malfunction-alarm device for informing an operator or displaying in an external display device a malfunction of a specific component, or an emergency stop device for stopping the operation of the specific component or the heavy vehicle itself.

It is also possible to provide the operation data-processing means (the operation data-determining means) with the optimum operation-determining means, which makes a judgement of whether each of the components of the vehicle is in an optimum operating condition (an optimum efficiency).

In this case, it would be preferable to provide an instruction display means as an external display device for instructing an operator to adjust the operation, which performs a comparison between a predetermined optimum value and detected data obtained from a sensor for detecting operation efficiency such as an engine revolution sensor, a fuel supply sensor, a pumping volume-detecting sensor or a pump ejection pressure-detecting sensor.

Figure 5:
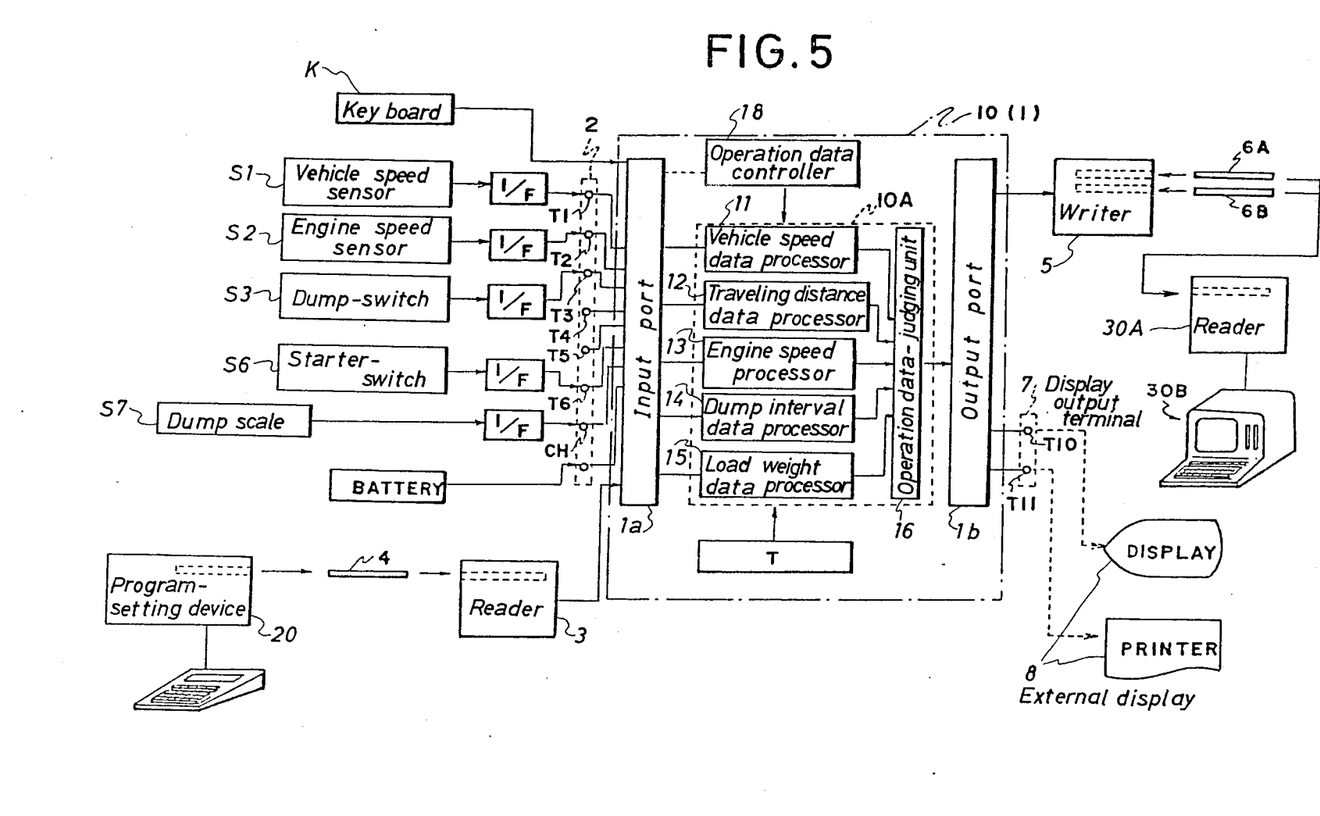
FIG. 5 is a block diagram showing another embodiment of this invention, wherein operation data are dually stored in an external memory.

FIG. 5 shows another embodiment of this invention, wherein actual work data obtained from the work data-processing means 10A are written (recorded) as time sequence data and as statistical data respectively in output data IC cards 6A, 6B.

When the detected signals are dually processed in the work data-processing means 10A to give both time sequence data and statistical data, these data are individually stored in separate external memories (IC cards).

To be more specific, the data processed by the data-processing means 10A are transferred without change through an output port 1b to the data writer 5 as time sequence operation data and stored in the time sequence IC card 6A.

At the same time, the time sequence data are output to the work data-statistic processing means.

This statistic processing means is provided with a memory M which preliminarily contains a program for processing work data in accordance with a control specification, and therefore is capable of carrying out a statistical processing of work data.

In this embodiment, values of engine revolution and running speed are separated into suitable zones (numerical zones), and a judgement that in which zone an actual work data belongs is conducted and a histogram showing a total number of these values is utilized.

The statistic data thus processed by the statistic processing means 10B is transferred one by one at the each end of the operation, or totally after the completion of the whole operations, and written in the statistic data IC card 6B.

This data writer 5 includes a card insertion portion into which the time sequence data IC card 6A as well as the statistic data IC card 6B can be detachably inserted with one-touch. Time sequence operation data can be written into the time sequence IC card 6A, and statistic data can be written into the statistic data IC card 6B by this data writer 5.

The work data (or operation data) of each of the components may be written into a separate IC card 6A, or may be integrally written into one IC card 6A.

A plurality of contact points and a plurality of semiconductor memories corresponding to the contact points may be provided in one IC card, thereby allowing simultaneous writing of both time sequence data and statistic data by using a plurality of writing heads.

The time sequence data as well as statistic data may be individually stored in a virtual memory, thereby allowing these data to be alternately written into one memory such as an IC card.

If these structures are adopted, a multi-recording of data in one memory can be realized.

According to the system of this invention, measurement signals from sensors or measurement means adopted in accordance with the operation content of a machine are processed on the basis of a predetermined operation data-processing program prepared by an operation administration personal, so that the operation data of various kinds of machine can be recorded by a single operation data-recording system and by optionally changing the operation data-processing program. Therefore the system of this invention is superior in general-purpose property.

Further, the system of this invention allows a very strict control of the operation of a machine by selecting a suitable operation data-processing program for collecting operation data under various operation conditions.

What is claimed is:

1. An operation data-recording system for a construction machine wherein a card-type memory is detachably fitted to a data-recording apparatus mounted on said construction machine, operation data of said construction machine detected from sensors mounted on said construction machine and other operation data for said construction machine fed from an external input means are recorded in said card-type memory, and said data stored in said card type memory is then processed with a data processing apparatus to analyze said operation data and said other operation data;

said system comprising:
said card-type memory stored with a program for processing data on an operation performed by said construction machine, said program being written by said data-processing apparatus;
a data reader which receives said program for processing said operation data when it is determined that an identification code in said card-type memory fed to said data-recording apparatus is in agreement with a predetermined code of said construction machine;
said sensors mounted on said construction machine, including a travelling speed sensor to detect a speed of the machine, an engine speed sensor to detect a rate of revolution of the engine, an operation time sensor to detect an operation interval or an operation period, and a work load sensor to detect an amount of material loaded in said machine;
said data-processing apparatus comprising means to process input signals from said sensors in accordance with said program;
a malfunction-determining means to determine if values received by said malfunction-determining means from said sensors exceed predetermined standard values furnished from said card-type memory;
a malfunction indicating means controlled by said malfunction-determining means to indicate a malfunction of said machine when said sensor values exceed said predetermined standard values; and
an optimum operation-determining means to make a comparison of signals detected by said sensors with an optimum efficiency value, and to supply results of said comparison to an external display apparatus.

2. The operation data-recording system according to claim 1, which further comprises a writing means to write operation data processed by said data-processing apparatus in said card-type memory.

3. The operation data-recording system according to claim 2, wherein said card-type memory to record said operation data is the same as that employed for storing said programs.

4. The operation data-recording system according to claim 1, wherein the program stored in said card-type memory is erased by an erasing means after being stored in said data processing means through said data reader.

5. The operation data-recording system according to claim 1, which further comprises an external display output terminal for externally displaying the operation data obtained through said data-processing means.

6. The operation data-recording system according to claim 2, wherein said writing means is provided with a means for separately storing said operation interval and said processed data in said card-type memory.

* * * * *